United States Patent Office 3,017,225
Patented Jan. 16, 1962

3,017,225
TRACK-CHAIN LINK
Walter Ruf, Landhaus am See, Bottighofen,
Thurgau, Switzerland
Filed Oct. 7, 1958, Ser. No. 765,824
3 Claims. (Cl. 305—51)

The present invention relates to a track-chain link. The usual, metal track-chains for caterpillar vehicles possess the drawback that the wear of the chains is very great in consequence of the impact of the chain links on hard ground, the road surface is damaged and also much noise is caused. It has already been proposed that rubber chains should be adopted, but it has been found that such rubber chains are unsuitable for travelling with military vehicles over rough ground because of their poor lateral stability. In addition, when travelling cross-country they have less hold on the ground that steel chain links.

In order to eliminate the said drawbacks the present invention proposes to provide a cavity in the part of the metallic chain link, in which cavity a rubber block is arranged and detachably fixed, in such a way that when the chain link lies on hard, flat ground the rubber block alone makes contact with this ground, whilst the metal parts, provided with metal gripping surfaces and located beside the rubber block, remain somewhat away from the ground.

This construction enables the vehicle when on a road to run entirely on rubber, so that the wear of the track chain is reduced, the road surface is not damaged by the metallic chain link, and the noise is further greatly diminished.

Figure 1:
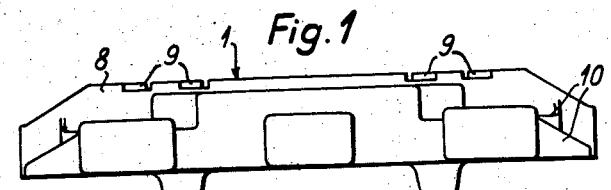
Figure 2:
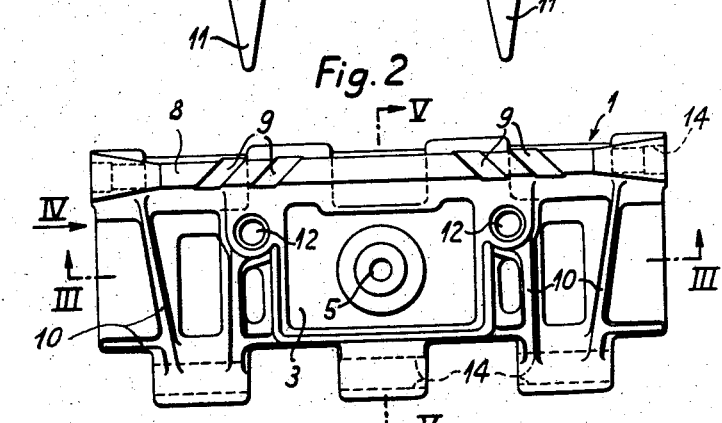
Figure 3:
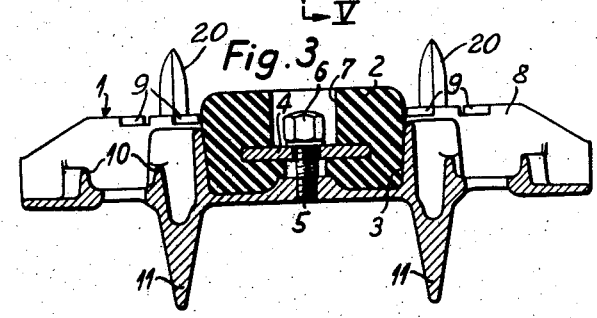
Figure 4:
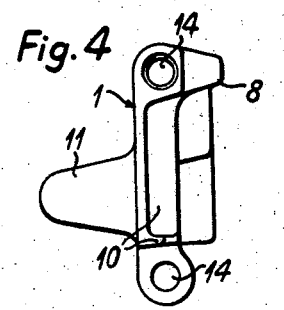
Figure 5:
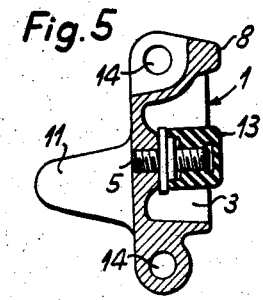

In the accompanying drawing one example of execution of a track-chain link according to the invention is shown. In this drawing:

FIG. 1 shows an elevation of the chain link,
FIG. 2 a plan view thereof,
FIG. 3 a section on the line III—III in FIG. 2,
FIG. 4 a side view in the direction of the arrow IV in FIG. 2, and
FIG. 5 a section on the line V—V in FIG. 2.

The illustrated chain link consists essentially of a cast steel part 1 and a rubber block 2, the latter being detachably fixed in a cavity 3 in the part 1 by means of a metal disk 4, which is drilled through and cast into the rubber block, the metal disk being then set onto a threaded bolt 5 fixed in the cavity and held on the bolt by means of a cap nut 6, so that the rubber block is firmly secured in the cavity. The rubber block fits tightly in the cavity, so that it has an excellent hold. The nut 6 can be turned by means of a socket wrench which can be introduced into a recess 7 provided in the rubber block.

As can be seen in FIG. 3, the rubber block 2 projects about 10 to 15 mm. beyond the part 1, so that when the chain link lies on hard, flat ground the rubber block alone make contact with the ground, whilst the metal parts of the link, i.e. the steel part located around the rubber block, remain somewhat away from the ground. The gripping surfaces of the metallic part of the chain link consist of the rib 8 with two pairs of sharp-edged grooves 9 running obliquely to the direction of travel of the chain as well as of the other ribs 10. Two projections 11 serve for guiding the track-chain on the running wheels of the vehicle and for driving the chain by the teeth of a sprocket wheel.

In winter, when there is snow and the streets are covered with ice, it is preferably instead of the rubber block 2 to insert ice spurs 20 into the taper holes 12 as shown in FIG. 3 and to protect the threaded bolt 5 from damage by screwing onto it a steel protecting cap 13, as illustrated in FIG. 5. In this case, the edges of the cavity 3 and the protecting cap 13 form further gripping surfaces.

The chain links are hinged together one to the other in well known manner by pivot bolts being passed through the holes 14. When the rubber blocks are inserted, the vehicle runs on the roads entirely on rubber, whilst when travelling cross-country the rubber blocks enter the soft soil, so that the gripping surfaces of the parts 8, 9 and 10 become effective. Therefore with such a chain it is possible to travel on roads and cross-country, without any drawback occurring in one case or the other. Defective chain links can be changed for others by withdrawing the pivot bolts, and rubber blocks that are still good can be used again. On the other hand, damaged rubber blocks can be changed simply and quickly for others without dismantling the chain. However, when rubber blocks become worn it is not urgently necessary to change them, since the vehicle remains absolutely serviceable in spite of such wear.

What I claim is:

1. A track chain link for track laying vehicles comprising a metal plate having a ground engaging face provided with a plurality of integral gripping elements projecting outwardly therefrom, said elements including a longitudinal element and a plurality of longitudinally-spaced-apart transverse elements, said face being formed with a cavity between said transverse elements occupying a minor portion of the surface area of said face, a rubber block seated in said cavity, a drilled-through metal disk cast in the rubber block, a threaded bolt secured in the cavity of the link, a nut screwed on the bolt to hold the rubber block firmly in the cavity, said block extending outwardly a predetermined distance greater than said gripping elements to permit said block to engage the ground prior to engagement by said elements, whereby on hard ground said block is the sole ground engaging portion of said link but on soft ground said link engages the ground with said block and said gripping elements, said plate being formed with recesses for receiving ice spurs for traction on ice-coated surfaces.

2. A track chain link for track laying vehicles comprising a metal plate having a ground engaging face provided with a plurality of integral gripping elements projecting outwardly therefrom, said elements including a longitudinal element and a plurality of longitudinally-spaced-apart transverse elements, at least some of said transverse elements being inclined with respect to the longitudinal axis of said chain link, said face being formed with a cavity between said transverse elements occupying a minor portion of the surface area of said face, a rubber block seated in said cavity and detachably secured therein, said block extending outwardly a predetermined distance greater than said gripping elements to permit said block to engage the ground prior to engagement by said elements, said predetermined distance being a minor proportion of the depth of said block, whereby on hard ground said block is the sole ground-engaging portion of said link but on soft ground said link engages the ground with said block and said gripping elements, said plate being formed with recesses for receiving ice spurs for traction on ice-coated surfaces.

3. A track chain link for track laying vehicles comprising a metal plate having a ground engaging face provided with a plurality of integral gripping elements projecting outwardly therefrom, said elements including a longitudinal element and a plurality of longitudinally-spaced-apart transverse elements, said face being formed with a cavity between said transverse elements occupying a minor portion of the surface area of said face, a rubber block seated in said cavity, a drilled-through metal disk cast in the rubber block, a threaded bolt secured in the cavity of the link, a nut screwed on the bolt to hold the rubber block firmly in the cavity, said block extending outwardly a predetermined distance greater than said gripping elements to permit said block to engage the ground prior to engagement by said elements, said predetermined distance being a minor proportion of the depth of said block, whereby on hard ground said block is the sole ground engaging portion of said link but on soft ground said link engages the ground with said block and said gripping elements, said plate being formed with means for receiving ice spurs for traction on ice-coated surfaces.

References Cited in the file of this patent

UNITED STATES PATENTS

| | | |
|---|---|---|
| 2,064,890 | Dorst | Dec. 22, 1936 |
| 2,294,409 | Kohn | Sept. 1, 1942 |
| 2,332,313 | Galanot | Oct. 19, 1943 |
| 2,686,697 | Baker | Aug. 17, 1954 |

FOREIGN PATENTS

| | | |
|---|---|---|
| 563,114 | Germany | Nov. 2, 1932 |